Nov. 6, 1928.

K. H. O. LÜBECK

ELECTRIC AUTOMOBILE

Filed Aug. 22, 1924

1,690,199

Inventor
K. H. O. Lübeck
By Marks Clerk
Attys.

Patented Nov. 6, 1928.

1,690,199

UNITED STATES PATENT OFFICE.

KARL HILDING OSSIAN LÜBECK, OF TSLINGE, SWEDEN.

ELECTRIC AUTOMOBILE.

Application filed August 22, 1924, Serial No. 733,625, and in Sweden June 21, 1924.

This invention relates to electric automobiles having the storage battery located in the fore part of the vehicle. The invention contemplates a systematic assembling of the required regulating and controlling apparatuses as well as the instruments in a common room, provided at a place, which is effectively protected from dust, dirt and wet and also from exterior effects, such as blows and the like, and which is at the same time easily accessible. By such means the possibility is obtained, for one thing, to perform in a simple and reliable manner the desired co-operation between certain of the said apparatuses, and for the other, that the electric circuits between the several apparatuses and the instruments can be made shorter and the application thereof simpler and, due to the protected location, more reliable than has hitherto been the case, and, besides, a greater clearness, manageableness and security of service will be obtained. Further, the costs of the plant will by such means be considerably reduced.

In electric automobiles hitherto known the aforesaid apparatuses are provided in several different manners, generally spread at different places of the vehicle and very often located, for instance at the bottom side of the vehicle, where said apparatuses as well as the electric conduits between them are in a high degree exposed to injurious effects. On this account the apparatuses are each often placed for instance in iron casings, which in turn increases the costs and also the total weight of the vehicle.

The invention has for its object to avoid the said drawbacks and, besides, to provide for such a location of the room containing the apparatuses that it does not interfere with the room for the battery, but that said latter room will be easily accessible. The invention consists essentially in this that the said apparatuses are placed in a housing, located in the fore part of the vehicle, in front of the driver's place and above the battery and which has such a form that the top of the battery will be easily accessible. The said housing may in this case preferably have an angular or similar cross-section having the apex directed towards the underlying battery, thus making the battery easily accessible.

Figure 1:
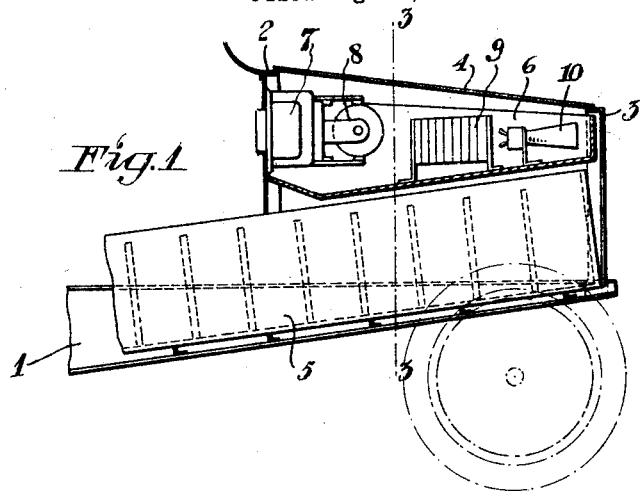
Figures 2, 3:
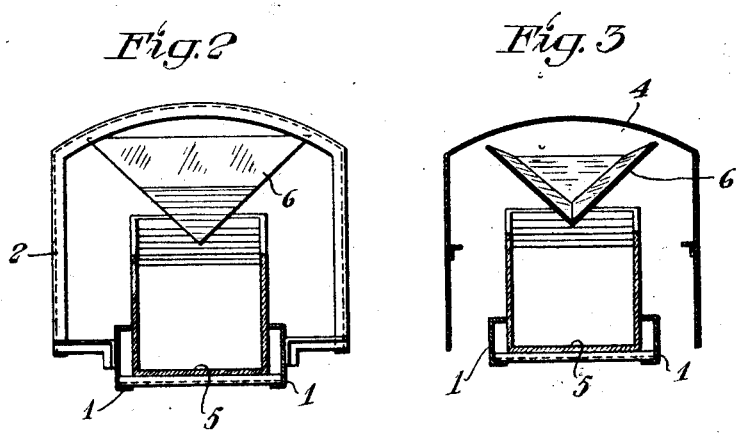
Figure 4:
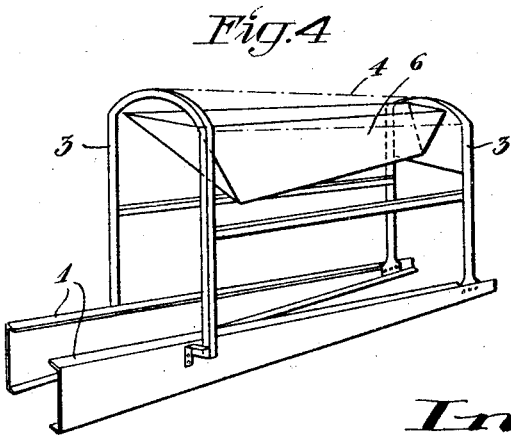

In the annexed drawing one form of embodiment of an arrangement according to the invention is schematically shown. Fig. 1 is a side view of the fore part of an electric automobile having an arrangement according to the invention. Fig. 2 is an end view thereof viewed from behind (from the left hand side of Fig. 1). Fig. 3 is a cross-section of the device along the line 3—3 of Fig. 1. Fig. 4 is a perspective view of a somewhat modified device.

In the drawing, 1 designates the frame work of the vehicle and 2 and 3 uprights secured thereto and carrying in common manner the protecting cover 4. Placed between the frame work is the battery casing 5 extending, as apparent from Fig. 1, to the fore end of the automobile. According to the invention a housing 6 is provided in the fore part of the automobile, in front of the driver's cab, said housing having in the form of embodiment shown, an angular cross-section and the apex directed towards the battery casing 5. The housing 6, which is open at the top and is covered by the protecting cover 4, is secured to the uprights 2 and 3 and has a decreasing cross-section in the direction from the rear end towards the front end, so that its lower edge will run in parallel with and at a certain distance from the battery casing 5 having an inclined position. As apparent, particularly from Figs. 2 and 3, the battery will by such an arrangement of the housing 6 be easily accessible at all places below the said housing. As shown in Fig. 1, the rear wall of the housing 6 is partly vertical and partly at its lower part inclined to some extent, so as to form a room for the driver's legs. Said wall may, however, also be wholly vertical, or wholly inclined, as shown in Fig. 4. As mentioned above, the said housing 6 has for its object to form a room adapted for assembling the required regulating and controlling apparatuses and the instruments, such as for instance controller, main switch, automatic charging switch, starting resistance, safety apparatus, ampere hour meter, speed measuring apparatus, electric signal apparatus and so on. Thus, there are shown in Fig. 1, by way of example, an ampere hour meter 7, a controller 8, a resistance 9 and an electric signal apparatus 10 mounted in said housing. The said more or less sensitive apparatuses will, thus, be effectively protected from dust, dirt, wet and exterior effects and will simultaneously be easily accessible. By such an assembling of the several apparatuses also a greater clearness, manageableness and security of service will be obtained and, besides, also the conduits between the several apparatuses will be shorter.

Obviously, the longitudinal sides of the housing may also be constructed with a suitable curved form, by which the space within the housing may be made larger. Its lower part ought, however, to be suitably wedge-shaped, so that the room immediately above the battery will be easily accessible. Besides, it is obvious that it does not meet with any difficulties to separate the apparatus room confined by the housing from the room containing the battery in such manner that gases ascending from the battery cannot enter into the room containing the apparatuses. The protecting cover covering the room containing the apparatuses and the battery room may further preferably be constructed in such manner that the part covering the first mentioned room can be opened independent of the parts covering the battery room and said latter parts independent of the former part.

What I claim as new and desire to secure by Letters Patent of the United States of America is:

1. In electric automobiles, the combination of a battery located in the fore part of the vehicle, a housing adapted to enclose controlling apparatus of the vehicle disposed in said fore part of the vehicle, in front of the driver's compartment and above said battery, said housing having such a shape that the top of the battery will be easily accessible.

2. In electric automobiles, the combination of a battery located in the fore part of the vehicle, a housing adapted to enclose controlling apparatus of the vehicle disposed in said fore part of the vehicle, in front of the driver's compartment and above said battery, said housing having a wedge-shaped cross-section, the apex being directed towards the battery.

3. In electric automobiles, the combination of a battery disposed in an inclined position in the fore part of the vehicle, a housing adapted to enclose controlling apparatus of the vehicle also disposed in said fore part of the vehicle, in front of the driver's compartment and above said battery, said housing having a gradually decreasing cross-section, so that its bottom will run substantially in parallel with and at a certain distance above the battery.

4. In electric automobiles, the combination of a battery disposed in an inclined position in the fore part of the vehicle, a housing adapted to enclose controlling apparatus of the vehicle also disposed in said fore part of the vehicle, in front of the driver's compartment and above said battery, said housing having a gradually decreasing wedge-shaped cross-section, the apex of which is directed towards the battery, so that its lower edge will run substantially in parallel with and at a certain distance above the battery.

5. In electric automobiles, the combination of a battery located in the fore part of the vehicle, a housing adapted to enclose controlling apparatus of the vehicle, also disposed in said fore part of the vehicle, in front of the driver's place and above said battery, said housing having such a shape that the top of the battery will be easily accessible, the rear wall of said housing turned towards the driver's compartment having an inclined position, so as to form a room for the driver's legs.

6. In electric automobiles, the combination of a battery located in the fore part of the vehicle, a housing adapted to enclose controlling apparatus of the vehicle, also disposed in said fore part of the vehicle, in front of the driver's compartment and above said battery, said housing having a wedge-shaped cross section, the apex being directed towards the battery, and the rear wall of the housing turned towards the driver's place having an inclined position, so as to form a room for the driver's legs.

7. In electric automobiles, the combination of a battery located in the fore part of the vehicle, a housing adapted to enclose controlling apparatus of the vehicle, also disposed in said fore part of the vehicle, in front of the driver's compartment and above said battery, said housing being open at the top and having such a shape that the top of the battery will be easily accessible, and a fore protecting cover common in automobiles covering the said open top of the housing.

8. In electric automobiles, the combination of a battery located in the fore part of the vehicle, a housing adapted to enclose controlling apparatus of the vehicle, also disposed in said fore part of the vehicle, in front of the driver's compartment and above said battery, said housing being open at the top and having a wedge-shaped cross-section, the apex being directed towards the battery, and a fore protecting cover common in automobiles covering the said open top of the housing.

9. In electric automobiles, the combination of a battery disposed in an inclined position in the fore part of the vehicle, a housing adapted to enclose controlling apparatus of the vehicle, also disposed in said fore part of the vehicle, in front of the driver's compartment and above said battery, said housing being open at the top and having a gradually decreasing wedge-shaped cross-section, the apex of which is directed towards the battery, so that its lower edge will run substantially in parallel with and at a certain distance above the battery, and a fore protecting cover common in automobiles covering the said open top of the housing.

In testimony whereof I affix my signature.

KARL HILDING OSSIAN LÜBECK.